(12) United States Patent
Corrigan et al.

(10) Patent No.: US 7,215,970 B2
(45) Date of Patent: May 8, 2007

(54) MESSAGING APPLICATIONS ROUTER

(75) Inventors: Louis Corrigan, Enfield (IE); Joseph Cunningham, Dublin (IE); John Murtagh, Dublin (IE)

(73) Assignee: Markport Limited, Dublin (IE)

( * ) Notice: Subject to any disclaimer, the term of this patent is extended or adjusted under 35 U.S.C. 154(b) by 493 days.

(21) Appl. No.: 10/202,651

(22) Filed: Jul. 25, 2002

(65) Prior Publication Data

US 2003/0003932 A1 Jan. 2, 2003

Related U.S. Application Data (63) Continuation of application No. PCT/IE01/00012, filed on Feb. 1, 2001.

(30) Foreign Application Priority Data

Feb. 4, 2000 (IE) .................................. 2000/0096

(51) Int. Cl.
*H04Q 7/20* (2006.01)
(52) U.S. Cl. ..................................... 455/466; 455/412.1
(58) Field of Classification Search ................ 455/466, 455/412.1, 412.2; 709/206, 207
See application file for complete search history.

(56) References Cited

U.S. PATENT DOCUMENTS 5,946,630 A * 8/1999 Willars et al. ............... 455/466
6,459,904 B1 * 10/2002 Lorello et al. ............... 455/466
6,507,589 B1 * 1/2003 Ramasubramani et al. . 370/465
6,636,501 B1 * 10/2003 Dispensa et al. ........... 370/351
6,718,178 B1 * 4/2004 Sladek et al. ............... 455/466
6,779,031 B1 * 8/2004 Picher-Dempsey .......... 709/224
6,842,462 B1 * 1/2005 Ramjee et al. .............. 370/466
6,857,073 B2 * 2/2005 French et al. ............... 713/168
6,862,264 B1 * 3/2005 Moura et al. ................ 370/229
2001/0030957 A1 * 10/2001 McCann et al. ............ 370/351
2001/0040887 A1 * 11/2001 Shtivelman et al. ........ 370/352
2003/0110344 A1 * 6/2003 Szczepanek et al. ........ 711/100
2004/0177148 A1 * 9/2004 Tsimelzon, Jr. ............. 709/227

FOREIGN PATENT DOCUMENTS

| EP | 000936825 A2 | * | 2/1999 |
| EP | 0936825 A2 | | 8/1999 |
| WO | WO97/08906 | | 3/1997 |
| WO | WO 97/08906 | * | 3/1997 |
| WO | WO97/36434 | | 10/1997 |

* cited by examiner

*Primary Examiner*—Lana Le
*Assistant Examiner*—Angelica Perez
(74) *Attorney, Agent, or Firm*—Jacobson Holman PLLC (57) ABSTRACT

A messaging applications router (MAR, 1) has router notes (RNs) which interface with external short message service centers (SMSCs). A management node (MN, 12) and each router node maintain a DNS server, and in the routing nodes the DNS servers are linked with a routing agent (RA). Each router node binds to SMSCs transparently to the ESMEs depending upon current load distribution and configuration settings.

21 Claims, 4 Drawing Sheets

MESSAGING APPLICATIONS ROUTER

This is a continuation of PCT/IE01/00012, filed 1 Feb. 2001 and published in English.

The invention relates to routing, particularly of short messages and associated signals in a mobile telecommunications network environment.

One object of the invention is to allow operators to scale short message capacity up or down in a simple and flexible manner.

Another object is to reduce the extent to which third party systems are connected to core network infrastructure.

SUMMARY OF THE INVENTION

According to the invention, there is provided a messaging applications router comprising:
- means for interfacing with a plurality external short message entities (ESMEs) for receiving mobile terminating messages generated by ESMEs and for sending mobile originating messages addressed to ESMEs;
- means for interfacing with a plurality of short message service centres (SMSCs) for receiving mobile originating messages addressed to ESMEs and for sending mobile terminating messages;
- routing means comprising means for routing said messages;
- a management means comprising means for setting a routing configuration, and
- a user interface comprising means for receiving user configuration settings and for outputting routing data.

In one embodiment, the routing means comprises means for interfacing with SMSCs transparently to the ESMEs whereby SMSCs can be added or deleted without affecting the ESMEs.

In another embodiment, the routing means comprises a plurality of router nodes.

In one embodiment, the router node comprises:
- a routing agent for bidirectional routing of messages, and
- a domain name server (DNS).

In another embodiment, the router node comprises means for sending bind requests to each SMSC associated with an ESME.

Preferably, each router node has an address.

In another embodiment, the address is an IP address.

In one embodiment, a DNS server comprises means for providing an address of a least busy router node.

In another embodiment, the DNS server comprises means for providing an address to a requesting ESME.

In one embodiment, the DNS server comprises means for polling router nodes to determine loading.

In another embodiment, the routing means comprises an external address distributor comprising means for routing signals for load balancing.

In one embodiment, the router comprises means for routing messages to more than one SMSC according to a load balancing process.

In another embodiment, the routing means comprises means for receiving operator inputs indicating available SMSCs and means for automatically detecting available SMSCs.

In one embodiment, the routing means comprises means for retrieving SMSC fault data in an SMSC, such as SS7 fault data.

In another embodiment, the user interface node comprises means for generating and outputting real time client data indicating message traffic and bound ESMEs.

In one embodiment, the user interface node comprises means for generating and outputting real time client data indicating router node traffic.

In another embodiment, the user interface node comprises a configuration management client comprising means for configuring ESME parameters, SMSC parameters, and a router node configuration.

In one embodiment, the management means comprises means for forwarding configuration data to the router nodes.

In one embodiment, the management node comprise an SNMP sub-agent for managing an alarm and statistics database.

In another embodiment, the management means comprises an event handler for receiving and logging event information from the router nodes.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

Figure 1:
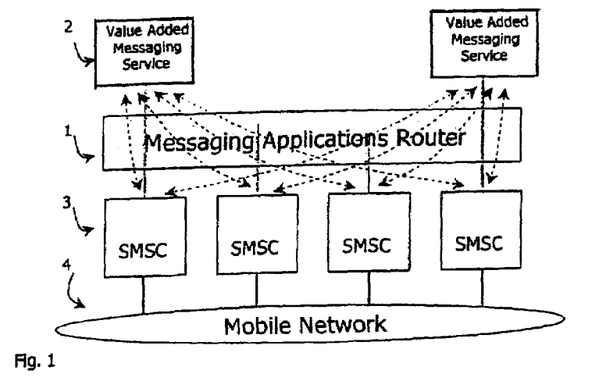
FIG. 1 is a diagram showing the context of a router of the invention.

Referring to the drawings, and initially to FIG. 1, a messaging applications router ("MAR" or "router") 1 interfaces on one side with value added messaging services (VAMSs) 2 and on the other with short message service centres (SMSCs) 3 of a mobile network 4. The VAMSs 2 are more generally external short message entities (ESMEs).

The router 1 provides a single contact point for VAMs platforms to connect to a network operator's SMS infrastructure. Mobile Terminated (MT) messages generated by VAMs platforms are distributed across SMSCs installed in the network. Similarly, Mobile Originated (MO) messages arriving at any SMSC are passed by the router 1 back to the correct VAMS platform.

The following are some of the key benefits:

Flexibility; SMSCs can be added or removed from the network with no impact on service.

High Redundancy; in the event of failure of an SMSC, traffic is automatically re-routed to other SMSCs in the mobile network.

Single point of contact; the Messaging Applications Router provides a single point of contact for all VAMS. VAMS do not need to be aware of the quantity or configuration of SMSCs within the network.

Separation layer; third party VAMS are not connected directly to core network infrastructure.

The MAR 1 has a simple user interface, allowing operators to configure SMS applications to be connected to one or several SMSCs in the network. This gives flexibility to the operator, allowing changes to be made to SMS traffic with no impact on service, and requiring no changes to the configurations of SMS applications. The changes that the MAR 1 supports include:

moving of an SMS application from an SMSC allocated for testing to the live network,     adding SMSCs to cope with increased messaging traffic,     adding SMS applications, and     rearranging and logically grouping SMS applications on specific SMSCs.

For Mobile Terminated (MT) traffic, operators can configure the router 1 to handle traffic from a particular SMPP (Short Message Peer to Peer) application in one of several ways:

(a) Designated with a single standby system

All messages from an SMPP application are routed to a single 'designated' SMSC. If this SMSC is taken out of service, traffic is routed to a standby SMSC (b) Distributed     Traffic is distributed over a number of SMSCs. In the event that one or more SMSCs are put out of service, traffic that would have been routed to the out of service SMSCs will be distributed over the remaining SMSCs (c) Designated with distribution for standby     This option is a combination of the two above. In normal circumstances all traffic is routed to a 'designated' SMSC. If this SMSC is taken out of service, traffic is distributed over a number of other SMSCs.

(d) Routing by destination number range. This is to distribute traffic over several networks, possibly with different technologies.

(e) Tiered routing modes using a combination of the method (a) and (d).

(f) The modular architecture allows additional routing methods to be easily added.

The MAR 1 is configured to run on a cluster of low-cost hardware platforms in an 'N+1' configuration. This approach gives the MAR 1 redundancy and scalability. Additional capacity can be provided by adding hardware platforms to the cluster.

Figure 2:
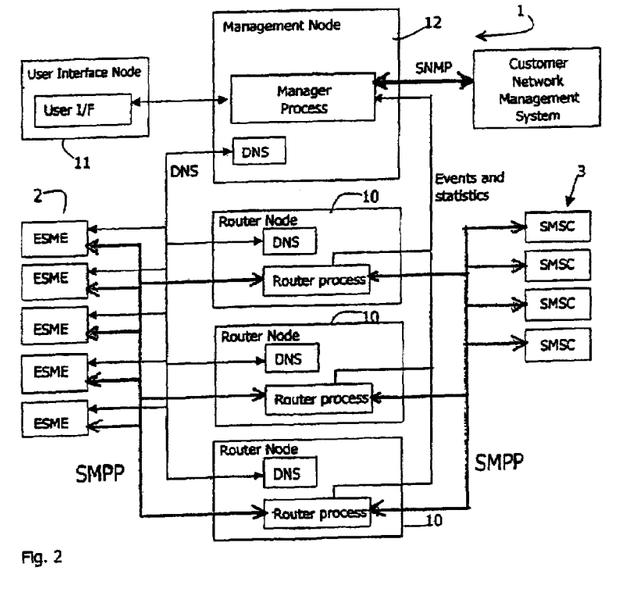
FIG. 2 is a diagram illustrating configuration of the router.

The MAR 1 has an architecture comprising three types of nodes, as shown in FIG. 2.

Router Node (RN) 10

The Router Node is responsible for accepting messages from ESMEs and passing them to SMSCs, and vice versa. A MAR 1 has at least two RNs for resilience reasons, but additional RNs can be added to cope with increased traffic volumes.

User Interface Node (UIN) 11

The User Interface Node allows users to configure and operate the MAR 1. The MAR 1 may have several UINs, although only one UIN can modify the live configuration at one time.

Management Node (MN) 12

The Management Node is responsible for collecting events, alarms and statistics, and communicating with the user interface. The MN 12 also sends Simple Network Management Protocol (SNMP) traps to the customer's network management system.

There is only one MN 12 in each MAR. In low capacity systems the MN can reside on the same hardware platform as one of the Router Nodes 10.

Router Node (RN)

Figure 3:
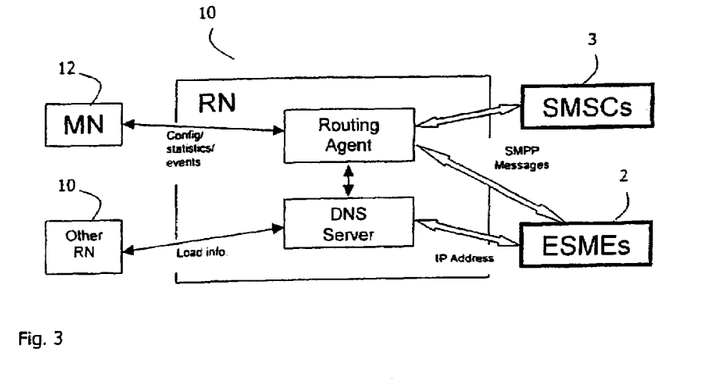
FIG. 3 is a diagram showing configuration of a router node of the router.

When an ESME sends a bind request to the MAR 1, the request is handled by one of two or more identical Router Nodes 10, shown in more detail in FIG. 3. The decision of which Router Node an ESME's request must be directed to is taken by an addressing function. As shown in FIG. 3, each RN consists of a Domain Name Server (DNS), and a Routing Agent (RA) implementing. a router process. Several DNS servers are available for redundancy. They run on any or all nodes in the MAR cluster. The Routing Agent is the RN's and MAR's functional core. The Routing Agent accepts Mobile Terminated messages from ESMEs and routes them to SMSCs in the network, and in the other direction receives Mobile Originated messages from Telepath SMSCs and routes them to ESMEs.

Handling ESME Binds

Figure 4:
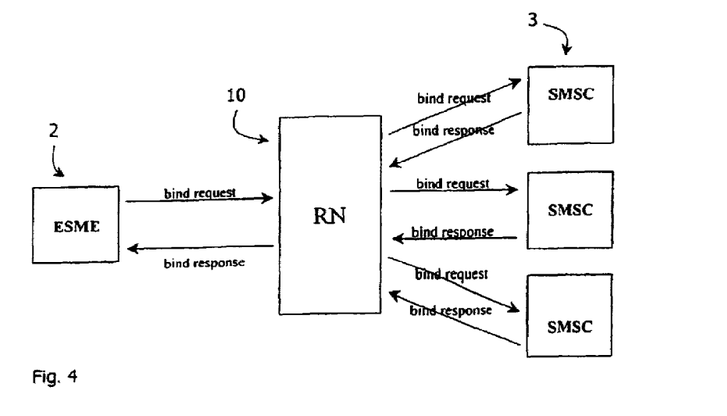
FIG. 4 is a diagram illustrating handling of bind requests from an ESME.

The MAR is transparent to ESMEs to avoid the need for changes to ESME software or configuration. When an ESME sends a transmitter bind request to the MAR, the Router Node 10 handling the request forwards bind requests to each SMSC the ESME is configured for, as shown in FIG. 4. Assuming that the bind to at least one SMSC is successful, all subsequent message Protocol Data Units are forwarded by the RN with little or no changes to fields in the PDUs. Where a receiver ESME connection is made, all MO messages stored for that ESME in the SMSCs are forwarded by the RN.

Selection of a Router Node—IP Addressing

As described above, the MAR has more than one Router Node that ESMEs may connect to. Each of these RNs has a distinct IP address. Two solutions have been developed to allow the ESMEs to use one address to contact the MAR and also to balance the load between the RNs. The operator has the option to select one or both of these solutions.

Option 1—Use of Domain Name Servers (DNS) within the MAR

Figure 5:
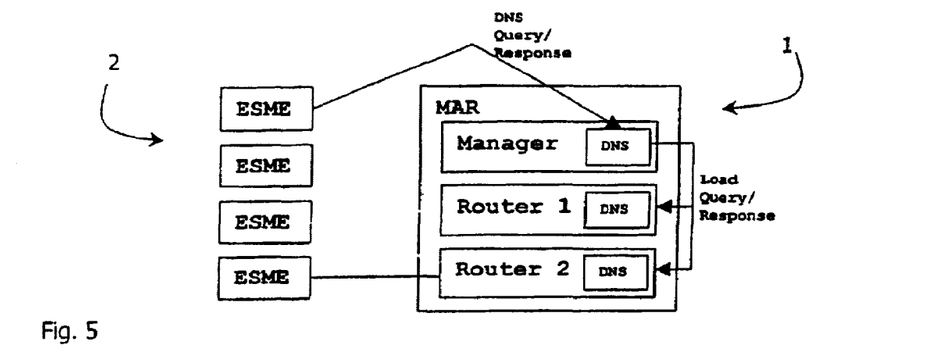
FIG. 5 is a diagram illustrating use of DNS to obtain an RN IP address.

A preferred solution is that each ESME is configured with a domain name for the operator's MAR rather than an IP address. This solution is illustrated in FIG. 5.

Before connecting to the MAR, an ESME first communicates with one of the MAR's DNS servers to obtain an IP address to connect to. (For resilience reasons, the ESME's DNS resolver file will always be configured with the IP addresses of at least two of the MAR's DNS servers). The DNS server responds with the IP address of the RN currently supporting the least number of ESME connections. The ESME will then connect to this IP address and establish an SMPP connection using a bind operation.

To determine the ESME loading of each RN, the DNS servers send an enquiry to each RN. The RN responses are used to sort the IP addresses returned. If an RN has failed, the DNS servers will not get response to a load enquiry, and therefore will not return the RN's IP address.

Option 2—Use of External IP Distributors

Figure 6:
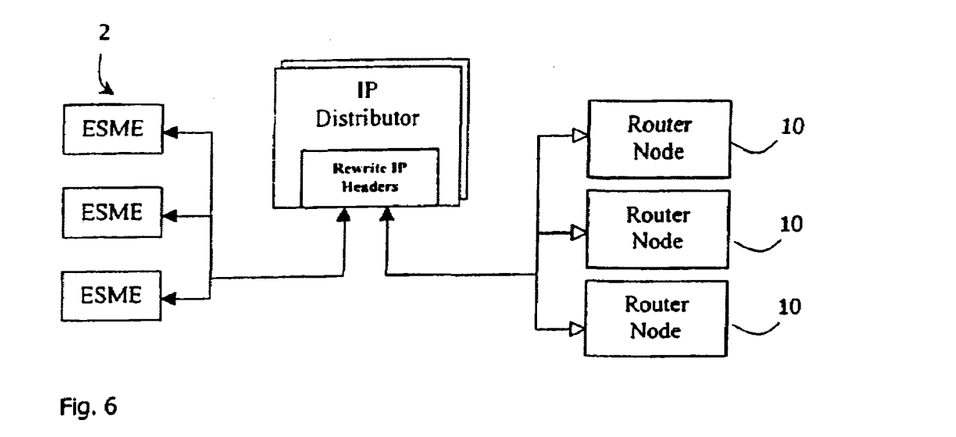
FIG. 6 is a diagram illustrating use of external IP distributors.

For operators who do not wish to implement DNS as a way of identifying the most available node, there is an alternative solution that uses external IP distributors, shown in FIG. 6. The external IP distributor uses a single IP address, which ESMEs use to open a TCP/IP connection. When ESMEs connect, the distributor will assign the connection to one of the RNs within the MAR based on their respective loads. Although ESMEs will continue to send all IP packets to the distributor, the distributor will rewrite packet headers and forward them on to the appropriate RNs. The distributor determines the most lightly loaded RN by selecting the RN currently supporting the smallest number of ESME connections. This option is suitable where ESMEs do not have to be modified to use Domain Names rather than IP addresses.

Distribution of Mobile Terminated Messages

The MAR can be configured to send Mobile Terminated (MT) messages from an ESME either to one designated SMSC, or to distribute them over several or all SMSCs. A third option provides a combination of these two approaches. The three message distribution methods are described below.

Routing MT Messages to a Designated SMSC with a Single Back-Up SMSC

In this case all traffic from the ESME is sent to a specific SMSC. One or more backup SMSCs can also be configured which would be used in the event of a failure of the designated SMSC. If such a failure occurs a distribution process, described below, is used by the RA to route messages to the backup SMSCs.

Distribution Over Several or All SMSCs

Routing of MT messages over more than one SMSC is performed using a 'hashing' process. This process uses a message's destination MSISDN to select which SMSC the message is to be sent to. The process meets the following requirements:

MSISDNs map to SMSCs in a deterministic manner. Messages sent by an ESME to a particular destination MSISDN are always routed to the same SMSC. This ensures that in normal circumstances messages to a particular ESME are always delivered in the correct order.

Messages are statistically distributed amongst the SMSCs in a configurable manner, so that SMSCs with a greater carrying capacity receive a greater proportion of messages.

The algorithm copes with the possibility of unplanned SMSC outage. In this case, messages initially destined for an unavailable SMSC are re-routed to an active SMSC. An SMSC outage does not disrupt the MSISDN/SMSC mapping for the other SMSCs. Traffic which was to be routed to the failed SMSC is re-routed over the remaining SMSCs. The algorithm handles MSISDNs containing alpha characters as well as numerical characters. The algorithm uses weighting values configured in the MAR for each SMSC to determine the proportion of messages to be sent to each SMSC.

Detection of SMSC and SS7 Network Failures

SMSC Failures

An operator may remove an SMSC from its network for maintenance or other reasons. The operator advises the MAR of this action by changing the system configuration on the MAR user interface. Router Nodes are then informed that no messages are to be sent to the inactive SMSC. The MAR also detects unplanned SMSC outages. Each Router Node monitors the SMSC connections it has established and will consider an SMSC as having failed if one of the following occurs:

an attempt to forward a message to the SMSC fails—the transaction times out, or the Router Node detects disconnection activity on the socket.

If either of these occurs the messages initially destined for the failed SMSC are rerouted to another SMSC by the message distribution algorithm. If all of the SMSCs an ESME is configured to use are detected as having failed, the MAR will initiate a disconnection sequence with the ESME.

It should be noted that in the event an ESME sends an enquire_link PDU to the MAR, the MAR forwards this query to the SMSCs currently bound in. If the MAR receives a valid response from at least one SMSC, it forwards this response to the ESME. The MAR will not return to it more than one enquire_link response to the ESME, in order to avoid confusing it.

SS7 Network Faults

A Router Node may cease to send messages to an SMSC if it believes the SMSC to be experiencing problems with its SS7 side. The MAR attempts to detect such problems by reading the relevant, SS7 fault data stored in an SMSC's OAM MIB database. As this database is updated by an SMSC with its failure and fault information, each Router Node periodically 'fetches' SS7 status from each SMSC that it has established a connection with. If an SS7 fault is detected on a particular SMSC, the RN will not forward messages to this SMSC until the fault is cleared. This feature can be disabled if required.

Interaction with Other Components

The Router Node must not only communicate with ESMEs, but also with the other elements that comprise the MAR. This internal interaction can be summarised as follows:

The Router Node obtains the user-entered configuration data from the Management Node.

A Routing Agent accepts queries from DNS components residing on a Router Node or Management Node. The RA responds with its current load level.

The RN periodically sends statistical information to the SNMP component residing on the Management Node.

The RN sends event information, as events occur, to an 'event handler' residing on the Management Node.

User Interface Node (UIN)

The User Interface Node resides on a Microsoft Windows™ platform. It consists of two components:

Real-Time Data Client—Displays statistical information in real-time, at user-specified time intervals.

Configuration Management Client—Allows the user to define the ESME, SMSC and Router Node configuration. Also allows the user to specify a file, residing on disk, which contains the translation table to be used by an SMSC. The MAR then sends this file to the appropriate directory on the SMSC platform.

As shown in FIG. 2, the UIN communicates with the Management Node. The UIN obtains statistical information from the MN, and sends it the latest ESME and SMSC configuration as defined by the user.

Real-Time Data Client (RDC)

The RDC window may be displayed by more than one user at any one time, and displays charts described below. The parameters displayed on the charts are updated periodically at an interval configured by the user.

Message Traffic—Time series line graph which plots the message rates; the number of MT, MO and total messages vs. time, being handled by the MAR. The MT, MO and total messages are shown as three distinct traces.

Bound ESMEs—Bar chart showing the number of currently bound ESMEs per Router Node.

Router Message Traffic—Bar chart showing the number of messages handled over the past (configured) time interval by each Router Node.

Configuration Management Client (CMC)

The MAR is configured using a Configuration Management Client (CMC). The CMC has three main groups of parameters:

ESME parameters
SMSC parameters
Router node configuration.

ESME parameters are used to configure each SMS application connected to the Router. Most of these parameters are those that would in the absence of the MAR be set directly on the Telepath SMSC, and include:

ESME Name
ESME Password
Default TON—Default ESME Type of Number
Default NPI—Default ESME Number Plan Indicator
Default MSISDN—Default ESME Address
Max Sessions—Maximum number of bind sessions the ESME is permitted
Routing TON—Type of Number used with Routing Expression
Routing NPI—Number Plan Indicator used with Routing Expression
Max Msg Length—Maximum length of message that can be submitted by the ESME
List of SMSCs—The SMSCs the ESME's messages may be sent to
AIM Type—Simplex or Multiplex AIMs to be used
Designated Throttling—Throttling rate
Distributed Throttling—Throttling rate SMSC configuration parameters are entered for each SMSC that the MAR must communicate to. The parameters include:

SMSC Name
SMSC IP Address
SMSC Enabled/Disabled
Weighting Value—The SMSC's weighting value, relative to the other SMSCs. This parameter is used by the message distribution algorithm to determine what proportion of ESME messages are to be sent to this SMSC In addition, parameters are entered for each Router Node within the MAR including:

RN Name
RN Enabled/Disabled
Prevent Further ESME Binds—When this flag is set the RN maintains existing ESME connections, but rejects further bind attempts.
Max ESME Connections—Maximum number of ESME connections allowed for this RN.

Management Node (MN)

Figure 7:
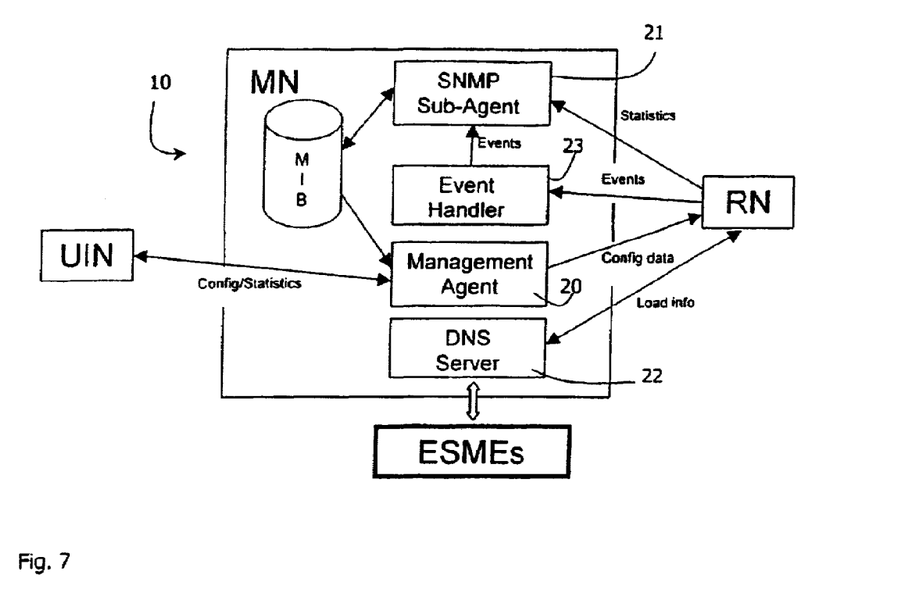
FIG. 7 a diagram showing configuration of a management node of the router.

As shown in FIG. 7, the Management Node consists of the following components:

Management Agent 20
SNMP Sub-Agent 21
DNS Server 22
Event Handler 23

The Management Agent (MA) 20 performs the following tasks:

Receives requests from the User Interface Node (UIN) 11 for statistical information, then retrieves and sends it the appropriate data.
Receives configuration data from the UIN.
Forwards ESME, SMSC and RN configuration data to the Router Nodes.
Remotely provisions the SMSC's AIM records with the latest ESME configuration data, including ESME name, password and throttling information. This allows the user to have in the MAR a central configuration point for many SMSC AIM parameters, as the user does not have to repeat the entry of the parameters at each SMSC.

The SNMP Sub-Agent is the custodian of the alarm and statistics database (SNMP MIB). It handles requests from the operator's SNMP Manager to view this information, and sends SNMP traps to the Manager when a system alarm is raised. The DNS component participates in the IP addressing function. The Event Handler component receives and logs event information from the Router Nodes.

ESME Message Throttling

The MAR can be configured on a per-ESME basis to support throttling of Mobile Terminated messages. To achieve this, the MAR simply configures throttling rates on the SMSC. When the maximum number of messages within a given time period has been reached, the SMSC sends an error message each time the SMS application attempts to submit another message, until the next time-period starts.

The MAR configures throttling on the SMSCs in two different ways depending on whether the MAR is configured to distribute traffic for the SMS application over a number of SMSCs, or to forward all messages to a single SMSC. These two cases are described below.

Distributed Throttling

Where the MAR is configured to distribute messages from an application over several SMSCs, the MAR divides this throttling rate amongst the SMSCs configured for this ESME according to the weighting assigned to these SMSCs and provisions these values.

Table 1 below gives a worked example for the case where:

the throttling rate set for the ESME is 20 messages per second, the ESME is configured to use SMSC 1, 2, 3 and 4, and the traffic capacity of SMSC 2 is twice that of the other SMSCs, and has been reflected in the weighting values assigned to each SMSC.

TABLE 1

Distributed Throttling example

| Telepath SMSC | Weighting Value | Throttling rate configured by the MAR for this Telepath SMSC |
|---|---|---|
| SMSC 1 | 40 | 8 messages per second |
| SMSC 2 | 20 | 4 messages per second |
| SMSC 3 | 20 | 4 messages per second |
| SMSC 4 | 20 | 4 messages per second |
| | Total | 20 messages per second |

The benefits of this approach are:

as traffic from an SMS application approaches the throttling level configured or the application on the MAR, throttling will start to happen on connections to all SMSCs from the MAR, and as SMSCs are taken out of service and the available traffic capacity reduces accordingly, the maximum traffic rate allowed for the ESME proportionally reduces.

Designated Throttling

Designated throttling can be used if the user has specified that an ESME's messages are to be sent to one, designated SMSC. For this case the throttling value entered at the Configuration Management Client is replicated in the associated AIM configuration provisioned on an SMSC by the MAR.

Where the MAR is configured for a particular SMS application to use designated routing with distribution over a number of SMSCs as a fallback, then separate Designated and Distributed throttling values can be configured.

MAR Access and ESME Security

The security features provided by the Messaging Applications Router cover two main areas:
 user Interface security, and
 password protection for ESMEs binding to the MAR and for the corresponding bind connections to SMSCs.

User Interface Security

Prior to viewing or entering any data on the MAR User Interface, a user must enter one of four passwords which have been set by the operator's designated system administrator for four different levels of access. If the password entered by the user is not recognized by the MAR, the user's request to display or modify MAR information is rejected.

The four passwords are defined below in ascending order of privilege.

i. Real-Time Data Client (RDC) Password
 The RDC is the user interface window that displays MAR real-time statistics. Although more than one user may display the real-time statistics at any one time, all users must enter the pre-defined password to do so.
ii. Configuration Management Client (CMC): Read-Only
 CMC is the set of user interface windows that allow a user to view and modify MAR parameters. The RDC password does not give a user access to the CMC facility. This 'CMC Read-Only' password allows a user to view all CMC parameters but not to modify them.
iii. CMC: ESME Parameters
 This is the lowest-level password that allows a user to modify MAR parameters and create a new configuration file. It allows a user to make an entry in all ESME parameter fields displayed in the CMC facility. Any attempted entry in another field is rejected. It is to be noted that this creation of a new configuration file will initiate the remote provisioning of SMSC AIM records by the MAR.
iv CMC: Full Access
 This password allows the user to make an entry into any CMC field and create a new configuration file. This is also the only level of access that allows the user to change the four UI passwords.

Additional user interface security features include:

Password Encryption
 All four User Interface passwords are subjected to encryption before being saved to disk. The (encrypted) passwords are stored in the MAR configuration file, as with the other (not encrypted) parameters displayed in the CMC windows. The encryption prevents anyone from obtaining the passwords by simply reading the file using standard Unix tools.

Password Display
 When passwords are entered at the User Interface they are not displayed on the screen Password Modification
 A user with the Full Access password can modify all passwords. When modifying a password the Full Access user is also prompted for the Full Access password before the password is successfully changed. During this procedure, the full access password and ESME configuration passwords are not displayed on the screen.

ESME Security

When ESMEs bind to the MAR, one of the parameters included by an ESME in its bind_transmitter and bind_receiver PDUs is a password. This password is used by the MAR to authenticate the ESME request. When the MAR makes corresponding bind requests for that ESME to Telepath SMSCs a different password is used by the MAR. This prevents an ESME from bypassing the MAR and establishing a direct connection to an SMSC.

From the user interface both passwords can be configured on the MAR:
 password for the bind from the ESME to the MAR, and
 password for the corresponding binds to Telepath SMSCs.

Optionally, the operator can set these passwords to the same value. This setting may be of use during migration of traffic from the SMSC onto the MAR.

Event and Alarm Reporting

Table 3 below lists the events and alarms to be generated and handled by the MAR. A user configurable option is provided to define the severity of each alarm and at which severity an SNMP trap should be generated.

TABLE 2

Events and Alarms

| Event No. | Textual Description | Generating Process | Notify/ Alarm |
|---|---|---|---|
| 1 | Routing process startup | Routing Process | Notification |
| 2 | Connection from ESME | Routing Process | Notification |
| 3 | Bind for ESME | Routing Process | Notification |
| 4 | Unbind from ESME | Routing Process | Notification |
| 5 | Disconnect from ESME | Routing Process | Notification |
| 6 | Message with invalid command ID | Routing Process | Alarm |
| 7 | Maximum PDU exceeded, e.g. 12 kB | Routing Process | Alarm |
| 8 | Unsuccessful bind (e.g. ID and password mismatch) | Routing Process | Alarm |
| 9 | Configuration file update (local/new copy) | Routing/Management Process | Notification |
| 10 | Routing process shutdown (Node shutdown) | Routing Process | Notification |
| 11 | ESME count threshold reached | Routing Process | Alarm |
| 12 | DNS sent out address | DNS | Notification |
| 13 | User Interface connected | Management Process | Notification |
| 14 | User Interface disconnected | Management Process | Notification |
| 15 | Connection made to SMSC | Routing Process | Notification |
| 16 | Disconnection from SMSC | Routing Process | Notification |
| 17 | Management agent startup | Management Process | Notification |
| 18 | Management agent shutdown | Management Process | Notification |
| 19 | SMSC connection ended abnormally | Routing Process | Alarm |
| 20 | Buffer to SMSC full | Routing Process | Alarm |
| 21 | Buffer to ESME full | Routing Process | Alarm |
| 22 | AIM provisioning failure | Management Process | Alarm |
| 23 | Router Node failure | Management Process | Alarm |
| 24 | Message throttling threshold exceeded | Routing Process | Alarm |
| 25 | SS7 failure | Routing Process | Alarm |

SNMP traps are forwarded to the operator's Network Management System. All alarms and events are also stored in an event log on the Management Node, and can be viewed using standard Unix tools.

Hardware Configuration

The Router Nodes and Management Nodes are deployed on a Hewlett Packard L1000™ server. As greater MAR capacity is required, additional servers are added, each acting as another Router Node. The User Interface Node (UIN) software runs on PC hardware. Several UINs can be used concurrently although only one UIN can modify the live configuration at a time. The MAR supports Sema, OIS, CMG EMI, and Nokia CIMO SMS message submission protocols.

It is envisaged that the MAR may include the following additional functionality:

Support for USSD. The MAR will be part of the USSD Server redundant configuration. To achieve this the Router needs to be enhanced to ensure that all USSD messages to a mobile are routed via the same USSD Server during a dialogue.

X.25 support.

Support for other non-SMPP protocols used by ESMEs.

SMPP Release 3.4 and Release 4.0.

Additional message distribution algorithms.

Support for routing of Wireless Internet data protocols.

Querying of an external database to determine routing and feature parameters (for example to allow black and white-listing, pre-pay SMS billing, mobile number portability, and distribution lists, diversion of SMS messages to an alternative subscriber.

The invention is not limited to the embodiments described but may be varied in construction and detail.

The invention claimed is:

1. A messaging applications router comprising:
   means for interfacing with a plurality of external short message entities (ESMEs) using SMS messaging protocols for receiving mobile terminating messages generated by said ESMEs and for sending mobile originating messages addressed to said ESMEs;
   means for interfacing with a plurality of short message service centres (SMSCs) using SMS messaging protocols for receiving mobile originating messages addressed to said ESMEs and for sending mobile terminating messages to said SMSCs;
   routing means comprising means for routing said messages;
   management means comprising means for setting a routing configuration;
   a user interface comprising means for receiving user configuration settings and for outputting routing data;
   wherein said interfacing means and said routing means route said message so that the router provides a single point of contact for said ESMEs such that the ESMEs do not need to be aware of the quantity or configuration of said SMSCs and so that the ESMEs and the SMSCs are not directly connected to each other;
   wherein said routing means and said management means comprise means for sending mobile terminated messages from any of said ESMEs to a plurality of SMSCs;
   wherein the routing means and the management means comprise means for routing mobile originating messages from an SMSC to a correct ESME;
   wherein the routing means and the management means comprise means for rerouting to other SMSCs mobile terminating messages initially destined for failed SMSCs;
   wherein the routing means and the management means comprise means for throttling mobile terminated messages to said SMSCs according to a configuration by monitoring the number of messages in a time period; and
   wherein said throttling configuration divides a throttling rate amongst said SMSCs according to weightings assigned to SMSCs; and
   wherein the routing means comprises a plurality of router nodes for accepting messages from ESMEs and routing them to SMSCs and for receiving messages from SMSCs and routing them to ESMEs; and
   wherein the routing means further comprises an addressing function for allowing ESMEs to use one address to contact the messaging applications router and for distributing ESME connections to router nodes according to their respective loads to balance their loads.

2. The messaging applications router as claimed in claim 1, wherein the routing means comprises means for interfacing with SMSCs transparently to the ESMEs whereby SMSCs can be added or deleted without affecting the ESMEs.

3. The messaging applications router as claimed in claim 1, wherein the routing means includes a plurality of router nodes and each router node comprises:
   a routing agent for bi-directional routing of messages, and
   a domain name server (DNS).

4. The messaging applications router as claimed in claim 3, wherein each router node comprises means for sending bind requests to each SMSC associated with an ESME.

5. The messaging applications router as claimed in claim 3, wherein each router node has an address.

6. The messaging applications router as claimed in claim 5, wherein the address is an IP address.

7. The messaging applications router as claimed in claim 5, further comprising a DNS server comprising means for providing an address of a least busy router node.

8. The messaging applications router as claimed in claim 7, wherein the DNS server comprises means for providing an address to a requesting ESME.

9. The messaging applications router as claimed in claim 7, wherein the DNS server comprises means for polling router nodes to determine loading.

10. The messaging applications router as claimed in claim 6, wherein the routing means includes an external address distributor comprising means for routing signals for load-balancing.

11. The messaging applications router as claimed in claim 1, wherein the routing means is configured to route messages to more than one SMSC according to a load balancing process.

12. The messaging applications router as claimed in claim 1, wherein the routing means comprises means for receiving operator inputs indicating available SMSCs and means for automatically detecting available SMSCs.

13. The messaging applications router as claimed in claim 12, wherein the routing means comprises means for retrieving SMSC fault data in an SMSC.

14. The messaging applications router as claimed in claim 1, wherein the user interface comprises means for generating and outputting real time client data indicating message traffic and bound ESMEs.

15. The messaging applications router as claimed in claim 14, wherein the user interface comprises means for generating and outputting real time client data indicating router node traffic.

16. The messaging applications router as claimed in claim 1, wherein the user interface includes a configuration management client having means for configuring ESME parameters, SMSC parameters, and router node configuration.

17. The messaging applications router as claimed in claim 1, wherein the management means comprises means for forwarding configuration data to the router nodes.

18. The messaging applications router as claimed in claim 1, wherein the management means includes an SNMP sub-agent for managing an alarm and statistics database.

19. The messaging applications router as claimed in claim 1, wherein the management means includes an event handler for receiving and logging event information from the router nodes.

20. A computer program product comprising software code for causing operation of a digital computer as a messaging applications router as claimed in claim 1.

21. A routing system for a mobile telecommunications network comprising:
   a plurality of short message service centres (SMSCs);
   a plurality of external short message entities (ESMEs); and
   a messaging applications router including,
      means for interfacing with said plurality of ESMEs using SMS messaging protocols for receiving mobile terminating messages generated by said ESMEs and for sending mobile originating messages addressed to said ESMEs;
      means for interfacing with said plurality of SMSCs using SMS messaging protocols for receiving mobile originating messages addressed to said ESMEs and for sending mobile terminating messages to said SMSCs;
      routing means comprising means for routing said messages;
      management means comprising means for setting a routing configuration; and
      a user interface comprising means for receiving user configuration settings and for outputting routing data;
   wherein said interfacing means and said routing means route said message so that the router provides a single point of contact for said ESMEs such that the ESMEs do not need to be aware of the quantity or configuration of said SMSCs and so that the ESMEs and the SMSCs are not directly connected to each other;
   wherein said routing means and said management means comprise means for sending mobile terminated messages from any of said ESMEs to a plurality of SMSCs;
   wherein the routing means and the management means comprise means for routing mobile originating messages from an SMSC to a correct ESME;
   wherein the routing means and the management means comprise means for rerouting to other SMSCs mobile terminating messages initially destined for failed SMSCs;
   wherein the routing means and the management means comprise means for throttling mobile terminated messages to said SMSCs according to a configuration by monitoring the number of messages in a time period;
   wherein said throttling configuration divides a throttling rate amongst said SMSCs according to weightings assigned to SMSCs; and
   wherein the routing means comprises a plurality of router nodes for accepting messages from ESMEs and routing them to SMSCs and for receiving messages from SMSCs and routing them to ESMEs; and
   wherein the routing means further comprises an addressing function for allowing ESMEs to use one address to contact the messaging applications router and for distributing ESME connections to router nodes according to their respective loads to balance their loads.

* * * * *